R. P. JOHNSON.

Assignor, by mesne Assignments to E. J. SUMNER.

Apparatus for Drying Lumber.

No. 8,240. Reissued May 21, 1878.

WITNESSES
A. G. Avery.
F. H. Fowler

INVENTOR
Richard P. Johnson
By J. L. Schaffin Attyy.

R. P. JOHNSON.

Assignor, by mesne Assignments to E. J. SUMNER.

Apparatus for Drying Lumber.

No. 8,240. Reissued May 21, 1878.

WITNESSES

R. G. Morey

F. W. Foster

INVENTOR

Richard P. Johnson

By J. S. Chapin

Atty.

UNITED STATES PATENT OFFICE.

RICHARD P. JOHNSON, OF WABASH, ASSIGNOR, BY MESNE ASSIGNMENTS, TO ELI J. SUMNER, OF MOORESVILLE, INDIANA.

IMPROVEMENT IN APPARATUS FOR DRYING LUMBER.

Specification forming part of Letters Patent No. 66,594, dated July 9, 1867; Reissue No. 8,249, dated May 21, 1878; application filed March 14, 1878.

*To all whom it may concern:*

Be it known that I, RICHARD P. JOHNSON, of Wabash, Wabash county, Indiana, have invented a new and Improved Apparatus for Drying Lumber; and I do hereby declare that the following is a full, clear, and exact description thereof, which will enable others skilled in the art to make and use the same, reference being had to the accompanying drawings, forming part of this specification, in which—

Figure 1:
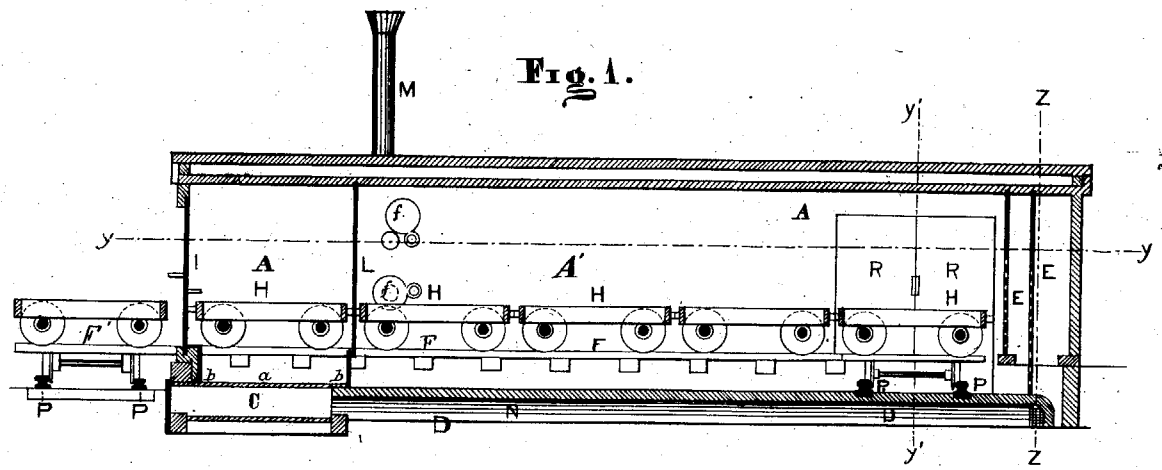
Figure 4:
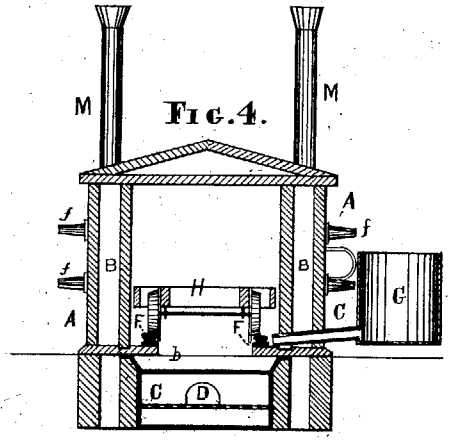
Figure 3:
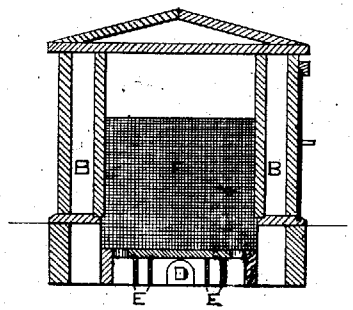
Figures 2, 5:
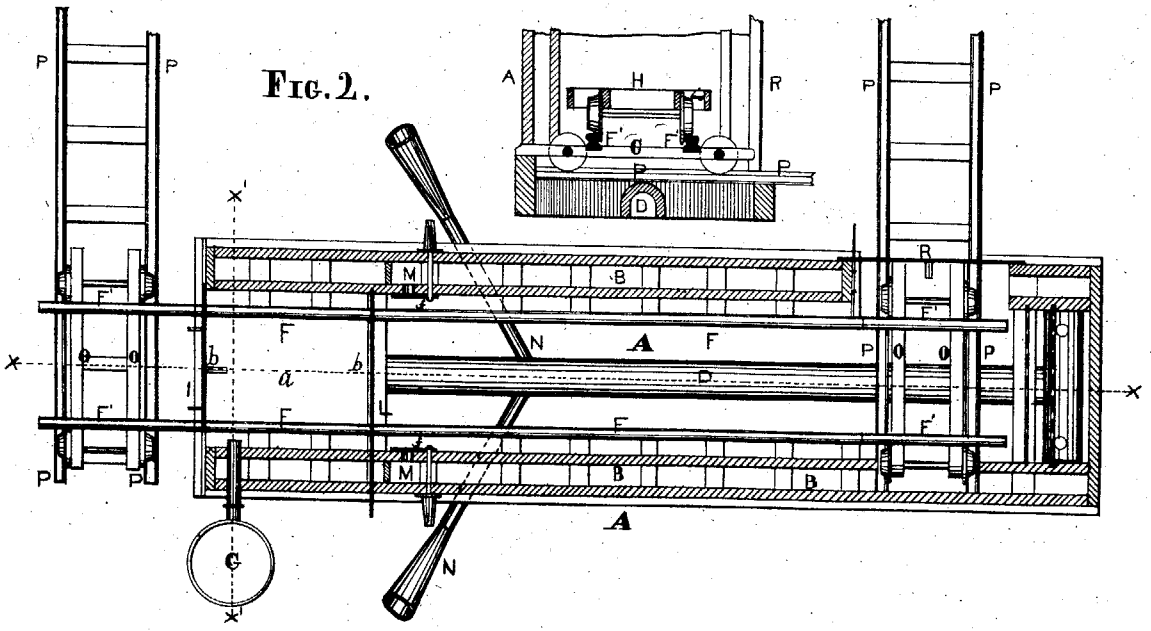

Figure 1 represents a vertical longitudinal section of my improved apparatus for drying lumber, the plane of section being indicated by the line *x x*, Fig. 2. Fig. 2 is a horizontal sectional view of the same, the plane of section being indicated by the line *y y*, Fig. 1. Fig. 3 is a vertical cross-section of the same, the plane of section being indicated by the line *z z*, Fig. 1. Fig. 4 is a similar view on line *x′ x′*, Fig. 2. Fig. 5 is a similar view, the plane of section being indicated by the line *y′ y′*, Fig. 1.

Similar letters of reference indicate corresponding parts.

This invention relates to an apparatus wherein wood of any description, whether split into lumber or not, may be steamed and dried, so as to be thoroughly seasoned.

It consists, first, in an apparatus for drying lumber, of a lower heating-chamber, which is provided with cold-air flues at its front ends, and communicates with an upper drying-chamber, at or near the rear of the apparatus, by an air-draft, the drying-chamber being provided with a door at its front end to admit car-loads of lumber, and a door at or near its rear end for discharging dried lumber, and an escape flue or flues at or near the front of the drying-room, whereby lumber in its greenest state comes into the drying-chamber where there is the least heat, and is gradually run backward to the rear end of the drier, against a current of hot air, to the point where the greatest heat is attained.

It further consists in a close chamber for drying steamed lumber by passing the products of combustion through a perforated screen directly into such chamber among the lumber from a flue passing beneath the dry-house its entire length, and in providing tubes for the admission of cold air into said flue, whereby the hot-air current is regulated and its discharge into the drying-chamber is equalized.

It consists, thirdly, in draft-tubes communicating with the heating-chamber, to attain a better combustion.

The floor of the building in which the apparatus is set up is provided with rails, so that the lumber on the trucks is passed into one end of the building and steamed. Thence it is brought into the drying-chamber, the floor of which is inclined, so that the trucks standing therein will be moved down automatically as the front truck is moved out of the drying room. The lumber can thus be brought to market on the same trucks on which it was first loaded, having been steamed and dried without having been unloaded from the trucks.

A represents a wooden building, placed upon suitable foundations, and provided with double side walls B B, as shown in Figs. 2, 3, and 4, for the purpose of better retaining the heat. Below one end of this building, and embedded in the ground, if desired, is a furnace, C, built of brick or other suitable material, having a suitable metal cover, *a*, that is provided with turned-up edges *b b*, as shown in Figs. 1 and 4, to serve as a pan for holding water. One or more horizontal flues, D, made of brick or metal, are arranged below the building, and are embedded in the ground, and extend from the furnace C to the other end of the building. They convey the products of combustion from the furnace to the opposite end of the building A, where the same enter the building through the meshes of wire-netting walls E E, arranged across the building, so as to arrest and prevent the sparks from entering the building.

Upon the floor of the building are placed one or more pairs of rails, F, extending from one end of the building to the other, as shown in Figs. 1 and 2, and even extending over the pan *a b*. Water is brought into the pan *a b* through a pipe, *c*, which is connected with a barrel or vessel, G, containing water.

The lumber to be dried is loaded upon trucks H H and brought to that end of the building A under which the furnace is arranged. The trucks are then brought into the building over the pan *a b*. The front doors I are then closed, and that part of the building in which the pan *a b* is contained is separated from the rest of the building by means of sliding doors L L.

The water in the pan is evaporated by the heat from the furnace below, and the lumber on the truck that stands above the pan is thoroughly steamed.

When the steaming is completed the doors L L are opened, and the trucks moved forward from the steaming-room A into the drying-room A′ until said drying-room is full.

In the drying-room the rails are laid slightly inclined downward from the entrance, as shown in Fig. 1, so that the cars therein will move backward of their own accord. The heated air and products of combustion from the furnace enter at the lower end of the drying-chamber, and dry the lumber at that truck which is at the extreme end of the building, as that stands directly above (or nearly so) the point where heat is discharged from the flue D, as shown in Fig. 3. The truck nearest the hot end of the kiln is then moved out of the building when the lumber thereon is sufficiently dried, the other trucks moved down, and so on continuously. A large quantity of wood can thus be dried so evenly as to prevent checking by the movement of the trucks backward against a continuous current of hot air, which is hottest at the rear of the apparatus.

The heat in the drying-chamber passes to the front part of the same and near to the doors L. It then passes out of the building through the chimneys M, in which dampers or registers *f* are arranged to regulate the escape of hot air.

N N are funnel-shaped tubes, to conduct a suitable quantity of fresh air into the flue D when required, so as to prevent the overheating of the air in the said flue, and to regulate the draft through such flue and through the drying-chamber to the chimneys M.

The trucks are, of course, built in such a manner that the air can pass freely through the same into the lumber.

When it is found impracticable to let the trucks out of the lower end of the building, and they have to be discharged through the sides, it is necessary to have the lower or more forward part F′ of the rails F mounted upon trucks O, which are placed upon cross-rails P, that are continued at the outside of the building, as shown in Fig. 5.

As the lumber on the lower car is dried, stops may be placed between said car and the one next to it, so as to prevent the line of cars from moving ahead when the last car is removed. The doors R at the side of the building are then opened, and the truck or car O is moved out on the track P. The car standing on the car O on the outside can be taken down from the car O, and the latter is moved back again into the building. The stops are then removed to let the whole row of cars H move forward again, a new car is brought into the steaming-chamber, and the process of steaming and heating is then gone on with, as before.

A similar arrangement for a cross-track with trucks O may be used for charging the steaming-chamber, as shown in front thereof at Figs. 1 and 2.

By this invention green lumber may be put into the building continuously and dry lumber removed therefrom continuously without slacking the fire or delaying the drying of the lumber that remains in the kiln.

I disclaim any novelty as to the combination of the steaming-chamber with a heating-chamber, as such has been used prior to this invention.

I claim, and desire to secure by Letters Patent, as new—

1. As an improvement in apparatus for drying lumber, a lower heating-chamber, D, and an upper drying-chamber, A′, the two chambers having a communicating hot-air draft at or near the rear of the apparatus, the drying-chamber having a door at the front end thereof for admitting car-loads of lumber, and the heating-chamber having a cold-air draft at the front of the apparatus, and a door at or near the rear of the apparatus for the exit of the car-loads of lumber when dried, and with escape-flues at or near the front end of the drying-chamber, whereby the moving current of air is hottest at the rear of the apparatus, and passes from thence to the escape-flues, and the lumber on the cars in its greenest state comes into the drying-chamber where the heat is least and passes backward, and is gradually dried by being moved against the current of hot air to the point where the latter is hottest.

2. The combination and arrangement of the furnace C, flue D, and perforated plates E, by which the products of combustion are discharged into the chamber A′ among the lumber, being driven through such chamber and discharged through the chimneys M, as herein described, for the purpose specified.

3. The tubes N, arranged in relation with the flue D, whereby the draft through the chamber A′ is regulated, as herein set forth, for the purpose specified.

RICHARD P. JOHNSON.

Witnesses:
E. J. SUMNER,
G. L. CHAPIN.